Sept. 1, 1959

R. B. TACKABERRY 2,901,942

MICROSCOPE FOCUSING MECHANISM

Filed Aug. 16, 1956

INVENTOR
ROBERT B. TACKABERRY

BY Herbert C Kimball

ATTORNEY

Sept. 1, 1959   R. B. TACKABERRY   2,901,942
MICROSCOPE FOCUSING MECHANISM
Filed Aug. 16, 1956   2 Sheets-Sheet 2

INVENTOR
ROBERT B. TACKABERRY
BY
Herbert C. Kimball
ATTORNEY

United States Patent Office 2,901,942
Patented Sept. 1, 1959

2,901,942

MICROSCOPE FOCUSING MECHANISM

Robert B. Tackaberry, Tonawanda, N.Y., assignor to American Optical Company, Southbridge, Mass., a voluntary association of Massachusetts Application August 16, 1956, Serial No. 604,411

3 Claims. (Cl. 88—39)

This invention relates to mechanism for focusing a microscope, and more particularly to focusing mechanism affording relatively rapid focusing movement.

An object of the present invention is to spring load the focusing mechanism in such a way as to contribute toward the optimum operation of the ways for sliding movement in the focusing of the microscope.

In the drawings which illustrate my invention I have disclosed in Fig. 1, a stereoscopic microscope, this view being principally in central vertical section.

Figure 1:
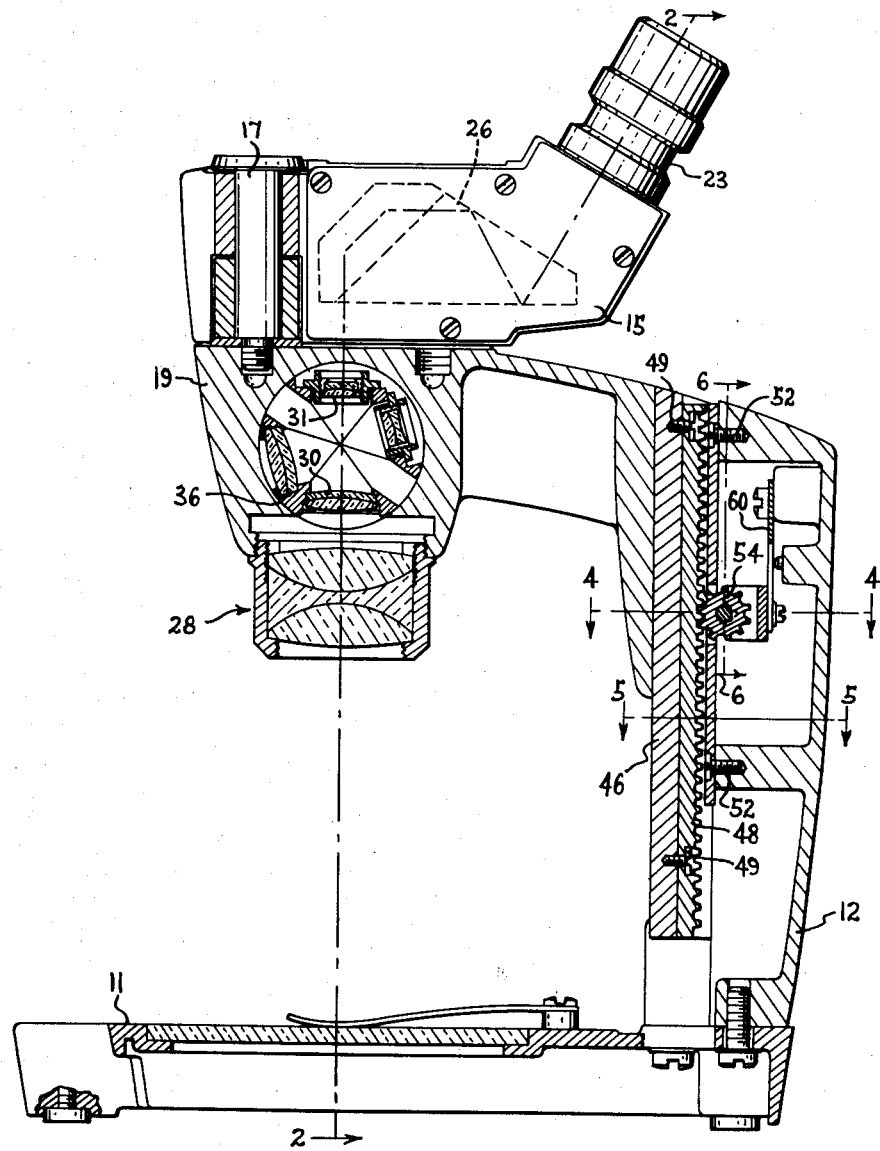
Figure 6:
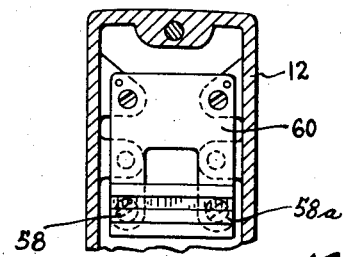
Figure 4:
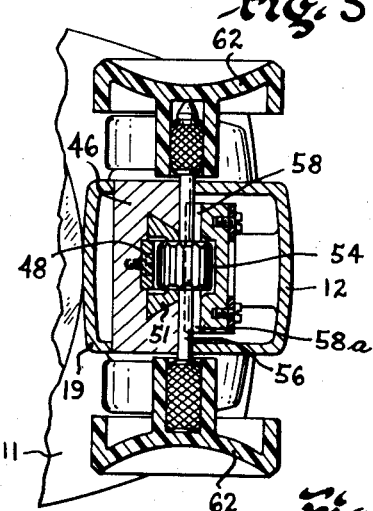
Figure 5:
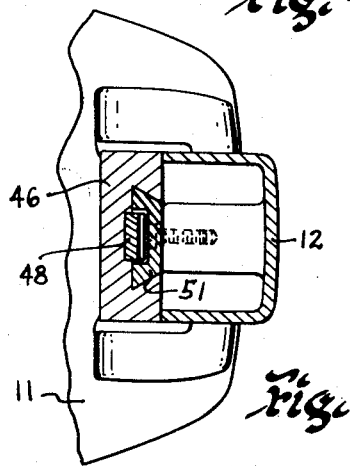

Figs. 4 and 5 are horizontal sections on the lines 4—4 and 5—5 respectively of Fig. 1 and Fig. 6 is a detail sectional view on the line 6—6 of Fig. 1 showing in elevation the spring mounting for the pinion bearing.

The dove-tail connection for the slide of a microscope is one of the best means of adjustably supporting a microscope, and a rack and pinion is the simplest mechanical movement for producing smooth adjustment. Difficulties arise, however, due to the fact that it is important to minimize play in the working of the rack and pinion, and at the same time the slide must be assembled in the cramped space available in a microscope. In accordance with my invention I have improved the working of the rack and pinion of microscope adjustment mechanism while overcoming the above mentioned difficulties.

I have chosen to illustrate in the drawings a microscope having an ample stage 11, which places the arm 12 at a substantial distance from the center line of the instrument. It is obvious that the greater the overhang of the body of the microscope, the greater the burden on the ways. These ways must provide for a considerable excursion in the examination of gears, threaded elements, machined parts and miscellaneous objects, as in the case of the stereo-microscope shown in the drawings, and this intensifies the problem.

In this form of microscope, a pair of prism bodies or housing 14 and 15 are pivoted on a stud 17 threaded into the main body 19 of the microscope. A pair of eyepieces 22 and 23 are carried by the housings 14 and 15 respectively for viewing the images which reach the eyepieces by way of the prisms 25 and 26.

Figure 2:
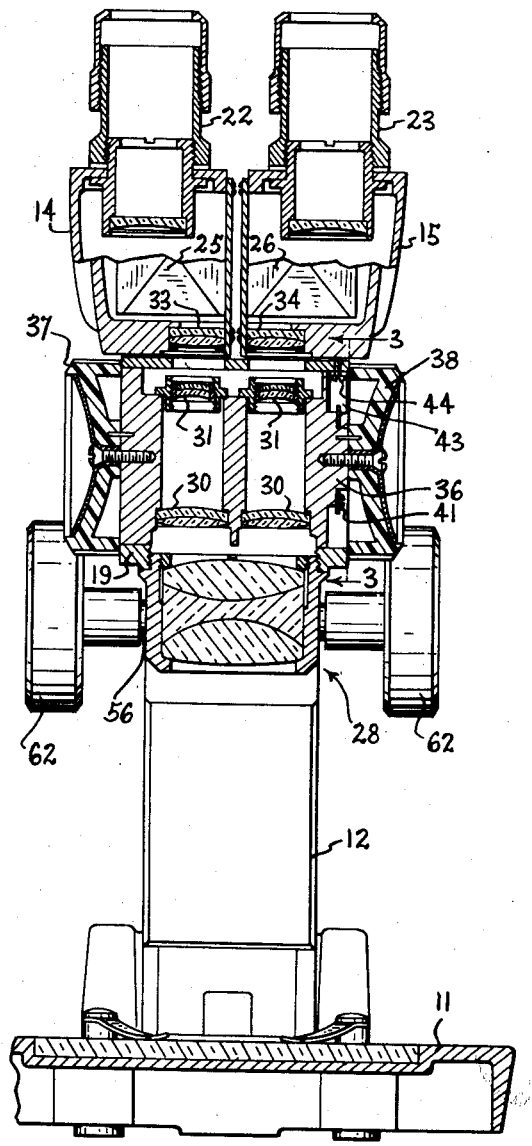
Fig. 2 is a partial section along the optical axis 2—2 of Fig. 1.

The objective 28 depending from the main body 19 of the microscope cooperates selectively with one or another of several pairs of Gallilean telescopic systems, each pair yielding a different magnification of stereoscopic images in cooperation with the objective 28 and the eyepieces 22 and 23. In Fig. 2 is shown in operative position a pair of telescopic systems, each system including a doublet lens 30 adjacent the objective lens 28 and a second doublet lens 31 adjacent the image forming lens 33 or 34 in the lower portion of the prism body 14 or 15.

Figure 3:
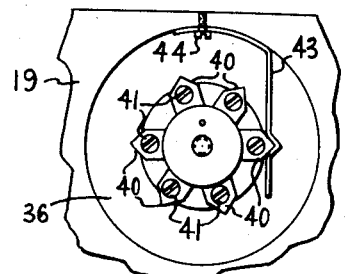
Fig. 3 is a detail view in vertical section on the line 3—3.

These telescopic systems are mounted in pairs in a rotatable cylinder 36 carried as shown in Figs. 1 and 2 in the main body 19 of the microscope. Knobs 37 and 38 are fixed to the two ends of cylinder 36 for turning the same in the body 19, and the indexing mechanism shown in Fig. 3 brings about accurate registry of each of the "positions" of the cylinder 36 with the optical axis of the objective 28 and lenses 33 and 34.

The indexing mechanism comprises a plurality of points 40, and each point is fixed to the cylinder 36 in accurately adjusted position by a screw 41. A spring 43 with a jog for receiving the registering point is fixed at 44 to the body 19. As each point 40 drops into the jog, the tension of the spring 43 tends to retain the cylinder with the telescopic systems in accurately registering position.

Referring now to Figures 1 and 4, it will be seen that the ways which permit the vertical travel of the body 19 relative to the arm 12 include gibs which are integral with a vertically extending slide 46 secured to the main body 19. Between the two gibs the slide 46 is recessed to receive a rack 48 which is secured thereto by screws 49. A vertical stationary column 51 in the form of a doubly beveled guide member (its cross section is shown in Figs. 4 and 5) is secured to the arm 12 by screws 52. Midway of the vertical column 51 is a recess or opening which permits the pinion 54 to extend through the column and engage the rack 48 for moving the main body 19 vertically while the integral gibs of the slide 46 engage the beveled sides of the guide member 51.

It is essential that there be a minimum of play between the slide and the vertical column 51, which it is difficult to obtain, even with the most careful fitting at the factory of the guide member 51 to the slide 46. I have promoted this minimum of play by the way in which I mount the pinion 54. The shaft 56 which carries the pinion 54 is journaled in V-shaped bearing blocks 58, 58a which bear against the back of the shaft 56 to either side of the pinion 54. The bearing blocks 58 and 58a, which in the form illustrated are integral, are in turn carried at the lower end of a tempered spring 60 which is best shown in Figs. 1 and 6. This is a leaf spring which is bifurcated so as to apply pressure to both the block 58 and the block 58a and in this way resiliently urge the pinion 54 into engagement with the rack 48. Through the rack 48 this spring pressure acts to maintain the two gibs wedged against the beveled sides of the column 51.

The two ends of the pinion shaft 56 carry knobs 62 for adjusting the main body 19 relative to the arm 12. Due to the ingenious construction of this adjusting mechanism the pinion is resiliently held against the rack 48 so that there is no backlash, and the same spring action avoids play in the guideways. Moreover the adjusting mechanism is very compact, and at the same time can be assembled with a minimum of difficulty.

I claim:

1. Adjusting mechanism for focusing a microscope comprising a slide having gibs formed by undercut walls of the slide and a rack fixed in the recess between said gibs, a stationary column in the form of a doubly beveled guide member received between said gibs and engaging said undercut walls, a pinion mounted in a recess in said column on a pinion shaft and a resilient mounting for rotatably supporting said pinion shaft, said resilient mounting applying pressure through said rack to urge the undercut walls of said slide against said doubly bevelled guide member to take up wear between the bearing surfaces of said slide and column.

2. The combination in a microscope stand of a slide for focusing the microscope, a stationary column having plane bearing surfaces with said planes angularly related, said slide having plane bearing surfaces engaging the bearing surfaces of said column in wedging relation thereto, a rack fixed to said slide, a pinion operative through a recess in said column to engage said rack and adjust the position of said slide, a shaft actuating said pinion and a spring mounting for said pinion shaft, said spring mounting both rotatably supporting said pinion shaft and applying pressure through said rack to urge the angularly related bearing surfaces of said slide against the bearing surfaces of said column and take up wear between said bearing surfaces.

3. The combination in a microscope stand of an arm having a recess, a column in the form of a doubly beveled guide member overlying said recess and secured to said arm, a slide with undercut walls enclosing said column, said undercut walls engaging the beveled surfaces of said guide member in a dove-tail bearing connection, a rack carried by said slide, a pinion extending from said recess through said column to engage said rack and adjust the position of said slide relative said column, a shaft mounting said pinion, and a V-shaped bearing mounted on a leaf spring in said recess and biased thereby against said pinion shaft for both rotatably supporting said pinion and pressing said pinion against said rack thereby urging the bearing surfaces of said dove-tail connection into wedging engagement.

References Cited in the file of this patent
UNITED STATES PATENTS

| | | |
|---|---|---|
| 1,987,776 | Hauser | Jan. 15, 1935 |
| 2,048,440 | Fassin | July 21, 1936 |
| 2,449,156 | Wittig | Sept. 14, 1948 |
| 2,544,371 | Weiser | Mar. 6, 1951 |